United States Patent [19]

Fraden

[11] Patent Number: 4,797,840
[45] Date of Patent: Jan. 10, 1989

[54] INFRARED ELECTRONIC THERMOMETER AND METHOD FOR MEASURING TEMPERATURE

[75] Inventor: Jacob Fraden, Hamden, Conn.

[73] Assignee: Thermoscan Inc., Tucker, Ga.

[21] Appl. No.: 9,181

[22] PCT Filed: Apr. 15, 1986

[86] PCT No.: PCT/US86/00782

§ 371 Date: Jan. 20, 1987

§ 102(e) Date: Jan. 20, 1987

[87] PCT Pub. No.: WO86/06163

PCT Pub. Date: Oct. 23, 1986

Related U.S. Application Data

[63] Continuation-in-part of Ser. No. 724,339, Apr. 17, 1985, abandoned.

[51] Int. Cl.$^4$ .............................. G01J 5/18; G01K 3/10
[52] U.S. Cl. ..................................... 364/557; 128/736; 374/133
[58] Field of Search ................. 128/736; 136/213, 214; 250/338, 338.3, 342; 364/557; 374/2, 128, 133

[56] References Cited

U.S. PATENT DOCUMENTS

| | | | |
|---|---|---|---|
| 3,023,398 | 2/1962 | Siegert | 250/338 X |
| 3,115,030 | 12/1963 | McHenry | 374/2 |
| 3,549,960 | 12/1970 | Wedlock | 136/213 X |
| 3,777,568 | 12/1973 | Risgin et al. | 374/128 |
| 3,809,920 | 5/1974 | Cohen et al. | 374/107 X |
| 4,001,586 | 1/1977 | Fraioli | 250/338 X |
| 4,005,605 | 2/1977 | Michael | 250/338 X |
| 4,147,562 | 4/1979 | Chiang et al. | 250/338 X |
| 4,379,971 | 4/1983 | Smith et al. | 250/342 |
| 4,418,392 | 11/1983 | Hata | 364/557 X |
| 4,423,408 | 12/1983 | Place | 364/571 X |
| 4,527,896 | 7/1985 | Irani et al. | 374/133 X |
| 4,634,294 | 1/1987 | Christol et al. | 364/557 X |

OTHER PUBLICATIONS

Thin Film Cuts Time of Detector Response, *Electronics*, Jun. 16, 1982.

*Primary Examiner*—Parshotam S. Lall
*Assistant Examiner*—Edward R. Cosimano
*Attorney, Agent, or Firm*—Hugh H. Drake

[57] ABSTRACT

An electronic infrared thermometer is disclosed comprising a housing forming an interior chamber, a pyroelectric sensor mounted within the chamber for sensing temperature change and generating an indicative electrical signal, means for directing infrared radiation from the object to be measured to the pyroelectric sensor, a shutter assembly for controlling the passing of infrared radiation to the pyroelectric sensor, an ambient temperature sensor for sensing ambient temperature within the interior chamber and generating an electrical signal indicative thereof, an electrical circuit for processing the electrical signals to calculate the temperature of the object to be measured, and an indicator for indicating the calculated temperature. The process for measuring the temperature of an object is also disclosed comprising shielding the pyroelectric sensor from infrared radiation from exterior to the thermometer housing, selectively exposing the pyroelectric sensor to infrared radiation substantially solely from the object to be measured to generate a first electrical signal related to the absolute temperature of the object to be measured, sensing the ambient temperature of the pyroelectric sensor and generating a second electrical signal proportional thereto, and electrically processing the first and second electrical signals to calculate the temperature of the object to be measured.

41 Claims, 5 Drawing Sheets

INFRARED ELECTRONIC THERMOMETER AND METHOD FOR MEASURING TEMPERATURE

CROSS REFERENCE TO RELATED APPLICATION

This is a continuation-in-part of application Ser. No. 724,339, filed Apr. 17, 1985, now abandoned.

BACKGROUND AND SUMMARY OF THE INVENTION

This invention relates to an electronic thermometer and more particularly to a noncontacting infrared electronic thermometer and method for measuring the temperature of an object.

The temperature of an object, such as the human body, can be determined by using a contact thermosensor or by measuring the naturally radiated energy from the body such as the radiated energy in the far infrared range. The infrared radiation is directly related to temperature of the object and can be utilized to determine the temperature of the body.

It is an object of the present invention to provide a new and improved noncontacting electronic thermometer which is accurate, reliable and economical to manufacture.

Another object of the invention is to provide a noncontacting electronic thermometer for measuring the temperature of an object virtually instantaneously.

A further object of the invention is to provide a noncontacting electronic thermometer for medical use which is compact, inexpensive and convenient and easy to use.

A further object of the invention is to provide a heat detector for medical use which detects warm spots on the surface of the skin.

A still further object of the invention is to provide a method for measuring the temperature of a body utilizing a high-speed pyroelectric infrared sensor and a relatively slow speed ambient temperature sensor.

DESCRIPTION OF THE PREFERRED EMBODIMENTS

Figure 1:
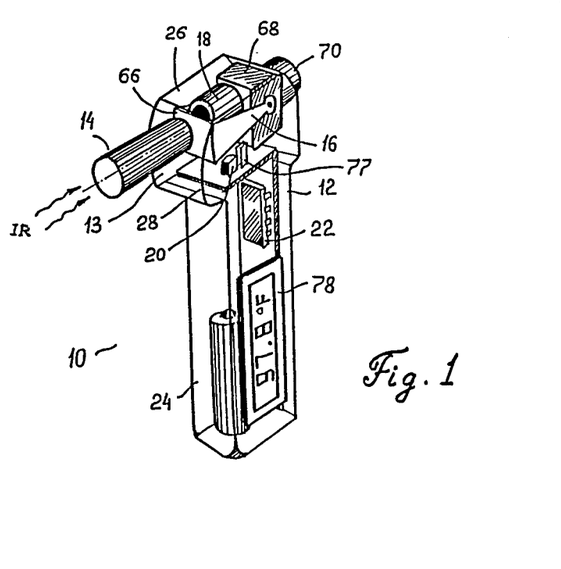
FIG. 1 is a diagrammatical broken away perspective view of the electronic thermometer of the present invention.
Figure 2:
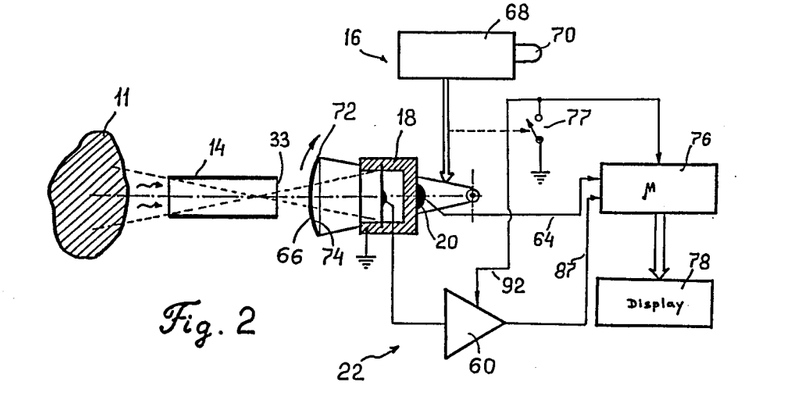
FIG. 2 is a diagrammatical schematic view of the electronic thermometer of the present invention.

Referring to the drawings wherein like numerals are used to identify the same or like parts, the electronic thermometer of the present invention is generally designated by the numeral 10. Referring to FIGS. 1 and 2, thermometer 10 generally comprises a housing 12 forming an interior chamber 13, a barrel or wave guide 14 for directing infrared radiation into the chamber 13, a shutter assembly 16 for controlling the passage of infrared radiation through the barrel 14, a pyroelectric sensor assembly 18, an ambient temperature sensor 20, and an electronic circuit 22.

The housing 12 has an elongated lower end 24 which forms a pistol grip type handle of convenient size for one hand operation The upper end 26 of the housing 12 forms the interior chamber 13 for mounting the pyroelectric sensor assembly 18 and the ambient temperature sensor 20, and provides a shield to exterior infrared radiation other than that received through the barrel 14.

The barrel 14 is mounted to the forward side 28 of housing 12 in alignment with the pyroelectic sensor 18 so as to direct or aim infrared radiation from the object 11 to be measured to the pyroelectric sensor mounted within the chamber 13. The barrel 14 is preferably made of metal and is interconnected to the pyroelectric sensor 18 so as to be in thermal equilibrium therewith. Alternately, the interior of the barrel may be metallized.

Figure 6:
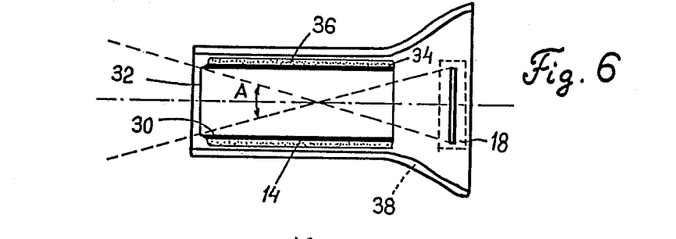
FIG. 6 is a diagrammatical sectional view of the beam aiming element of FIG. 2.

Referring to FIG. 6, the barrel 14 is cylindrically shaped with a smooth, shiny interior surface 30 to facilitate transmission of infrared radiation from the open receiving end 32 to the pyroelectric sensor 18 and to provide a low emissivity to reduce error generated by secondary radiation from the barrel 14 in the event the barrel temperature differs somewhat from the temperature of the pyroelectric sensor 18. The overall length of barrel 14 determines the angle of view A as shown in FIG. 6 and for most medical applications, the length of the barrel is preferably in the range of 2–10 centimeters.

Preferably, the outer surface 34 of the barrel 14 is thermally isolated from ambient heat sources such as the human body by a protective thermoisolator coating 36. An acceptable thermoisolator coating is plastic, e.g., a plastic made from a phenolic resin. The exterior surface of the protective coating 36 is shiny to reflect outside heat. As shown in phantom line in FIG. 6, a removable disposable protective cover 38 may be utilized in certain applications to prevent the barrel surface from contacting the object to be measured, e.g., to prevent contamination. The cover 38 has a low thermoconductivity and an acceptable material is a polyethylene type material. Alternately, a suitable optical assembly such as one comprising a polyethylene Fresnel lens may be utilized in place of the barrel 14 to direct the infrared radiation from the object 11 to the pyroelectric sensor 18.

Figure 3:
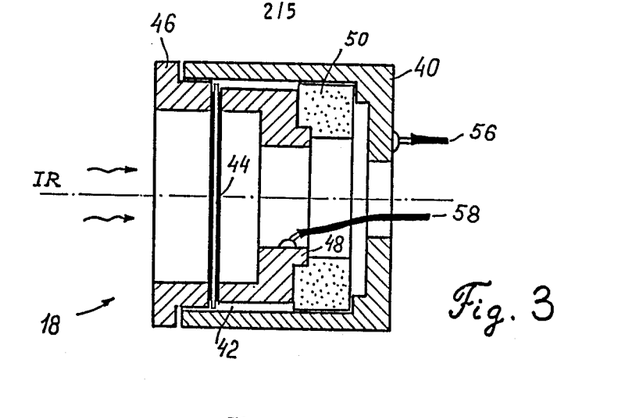
FIG. 3 is a diagrammatical longitudinal sectional view of the pyroelectic sensor.

The pyroelectric sensor assembly 18 is mounted within the chamber 13 and, as shown in FIG. 2, is positioned in alignment with the barrel 14 so as to receive the infrared radiation passing through the barrel 14. Referring to FIG. 3, the pyroelectric sensor assembly 18 comprises a base 40 forming an open-ended interior recess 42 for mounting a pyroelectric film 44 to receive the infrared radiation from the barrel 14. The pyroelectric film 44 is clamped between an outwardly disposed peripheral clamp 46 and an inwardly disposed peripheral contact ring 48. The contact ring 48 is securely mounted within the recess 42 in spaced disposition to the base 40. An insulating insert spacer 50 electrically insulates the contact ring 48 from the base 40 and, as shown in FIG. 3, the insert 50 cooperatively engages the interior end of the contact ring 48 so as to maintain the contact ring in spaced disposition relative to the base 40.

In the illustrated embodiment, the pyroelectric film is an ultra thin foil of pyroelectric material such as polyvinylidene fluoride (PVDF). If electrically polarized, such a film exhibits a pyroelectric effect in that it is able to generate an electrical charge in response to a change of its temperature produced by the receipt of infrared radiation. Other configurations and materials such as those generally disclosed in Smith et al, U.S. Pat. No. 4,379,971 and Cohen et al, U.S. Pat. No. 3,809,920 (which disclosures are incorporated herein by reference) may also be utilized. In the illustrated embodiment, polyvinylidene fluoride is a preferable material since it is sensitive to minute and rapid temperature changes in response to the infrared radiation utilized herein and is relatively economical.

Figure 4:
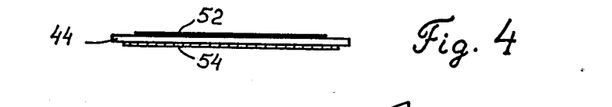
FIG. 4 is a diagrammatical sectional view of the pyroelectric film material of the pyroelectric sensor of FIG. 3.

Referring to FIG. 4, the pyroelectric film 44 may be of varying thicknesses ranging from 5 to 100 microns with the thickness being determined by the sensitivity and speed response desired for a particular application. A pair of planar electrodes 52, 54 are fixed on opposite sides of the polyelectric film 44 with the electrode 52 facing outwardly from the recess 42 to first receive the infrared radiation from the barrel 14. In the illustrated embodiment, the outer electrode 52 is black to provide high emissivity and absorption of infrared radiation and the inner electrode 54 is nontransparent and highly reflective of infrared radiation. Alternately, the outer electrode 52 may be transparent to far infrared radiation and the inner electrode 54 may be reflective to provide a greater speed response and sensitivity.

In assembly, the base 40 and the clamp 46 are electrically connected to provide shielding for the pyroelectric film 44. The base 40 and the outer electrode 52 are connected to ground by the ground lead 56. The inner electrode 54 is electrically connected to the lead wire 58 through the contact ring 48. The lead wires 56, 58 connect the pyroelectric sensor assembly 18 to the electronic circuit 22. The pyroelectric film 44 is polarized during the manufacturing process so that the polarity of the signal generated in response to the reception of infrared radition is compatible with the electronic circuitry being utilized. In the illustrated embodiment, the pyroelectrc film is appropriately polarized so that the inner kelectrode generates a negative signal in response to a positive temperature change. In operation, the pyroelectric sensor 18 senses temperature change and generates an electrical signal indicative thereof.

In practice, it has been found that pyroelectric sensor assemblies 18 employing pre-polarized pyroelectric films 44 are substantial superior in terms of cost and ease of manufacture to prior art infrared sensors employing, for example, charged polymer films, thermocouples, thermopiles, or the like. Specifically, in comparison to the prior art sensors, film 44 has a relatively large area, e.g., on the order of 1 $cm^2$, and is sensitive to infrared radiation impinging on essentially any part of that area. Accordingly, the infrared thermometers of the present invention do not require systems for focusing infrared radiation on the sensor, such as, focusing tubes, parabolic mirrors, lenses, or the like. This makes for a significantly simpler device, which in turn, lowers the overall cost of the device and makes the device easier to manufacture.

The ambient temperature sensor 20 is mounted within the interior chamber 13 in thermal equilibrium with the pyroelectic sensor 18, the barrel 14, and the shutter element 66 so as to sense or monitor the internal temperature of the housing 12. The ambient temperature sensor 20 senses the internal temperature of the housing 12 and generates an electrical signal proportional thereto which is applied to the electronic circuit 22 through the connector 64. Acceptable temperature transducers that may be utilized for such ambient temperature sensing include thermistors, thermopiles, semiconductors, etc. Importantly, the ambient temperature sensor may be relatively slow-acting as contrasted to the fast-acting pyroelectric sensor and need only have a response time sufficient to track the changes of the internal ambient temperature of the chamber 13.

The exposure of the pyroelectric film 44 to infrared radiation directed through the barrel 14 is controlled by the shutter assembly 16. The shutter assembly 16 comprises a shutter 66, a shutter control mechanism 68, and a manually actuated pushbutton 70. The shutter 66 is operationally mounted at the inner end 33 of the barrel 14 so as to be actuable between a normally closed position closing off the transmission of infrared energy from the barrel 14 to the pyroelectric sensor 18 and an open position permitting infrared energy to pass from the barrel 14 to the pyroelectric sensor 18.

The shutter control mechanism 68 is of conventional design providing a high shutter opening speed in the range of 5–25 milliseconds. Acceptable conventional mechanisms include a mechanical trigger assembly, a solenoid actuated means, a stepper motor assembly, etc. The shutter 66 is actuated to an open position by depression of the pushbutton 70 and remains in the open position a sufficient time to permit the pyroelectric sensor 18 to generate the electrical signal responsive to shutter opening as explained hereinafter. The shutter 66 is returned to its normally closed position after approximately 200 milliseconds. A mechanical timing gear is utilized to control the duration of the shutter 66 in the open position. Alternately, the timing gear may be electro-mechanical.

The shutter control mechanism 68 includes noise supression elements and shock absorbers to reduce acoustical noise and other mechanical forces during the shutter opening operation to control the accuracy of the responsive electrical signal generated by the pyroelectric sensor 18. Since the pyroelectric film 44 has piezoelectric properties, excessive acoustical noise or mechanical force can produce detrimental error and noise in the electrical signal generated by the pyroelectric film 44 in response to temperature changes.

The shutter 66 is configured to have a low thermal conductivity from its outer surface 72 to its inner surface 74 in order to prevent the shutter from becoming an extrinsically dependent secondary source of radiation to the pyroelectric film 44. Both the inner and outer surfaces of shutter 66 are reflective in nature in order to reduce emissivity and heating from external sorces. The shutter 66 is also mounted within the chamber 13 so as to be in thermal equilibrium with the pyroelectric sensor 18.

The electronic circuit 22 includes an amplifier circuit 60, a microprocessor or microcontroller 76, a shutter sensor switch 77 and a digital visual display device 78. The microprocessor 76 is interconnected to the ambient temperature sensor 20, the amplifier circuit 60 and the shutter sensor switch 77 to receive electrical input signals indicative of the internal ambient temperature of the thermometer housing 12, the actuation of shutter assembly 16, and the temperature differential between the pyroelectric sensor 18 and the object to be measured. The microprocessor 76 is of conventional design having suitable data and program memory and being programmed to process the electrical signal from the ambient temperature sensor 20 and the amplified electrical signal from the pyroelectric sensor 18 in accordance with the following description to calculate the absolute temperature of the body 11 to be measured. Based upon the calculated temperature of the subject 11, the microprocessor 76 generates a control signal to drive the display device 78 to visually indicate the calculated temperature.

More specifically, the amplitude of the electrical signal generated by the pyroelectric sensor is a nonlinear function of the difference between the temperature of the subject to be measured and the temperature of the sensor prior to exposure to the radiation emitted by the subject, i.e., the difference between the temperature of the subject and the ambient temperature of the thermometer. The general characteristics of this function can be described in terms of the Stefan-Boltzman equation for radiation and the Fourier equation for heat transfer. Both these equations, however, are highly non-linear. Moreover, there exists no known analytical relationship between the amount of radiation striking a pyroelectric film, such as a PVDF film, and the voltage produced by the film.

In accordance with the present invention, it has now been found that notwithstanding these non-linearities and the lack of an analytical relationship for film output, the temperature of a subject can be accurately determined using pyroelectric films by means of the following procedure. First, the voltage $V_{ir}$ produced by the film in response to radiation from the subject is approximated by the formula:

$$V_{ir} = f(T_a)(T_s^4 - T_a^4) \quad (1)$$

where $T_s$ is the absolute temperature of the subject, $T_a$ is the absolute ambient temperature determined from ambient temperature sensor 20, and $f(T_a)$ is a polynomial in $T_a$, namely, $$f(T_a) = a_0 + a_1 T_a + a_2 T_a^2 + a_3 T_a^3 + \ldots$$

Next, the coefficients $a_0$, $a_1$, $a_2$, $a_3$, etc. are determined for the particular sensor design and type of film being used by measuring $V_{ir}$ for a series of known $T_s$'s and $T_a$'s, substituting those values into equation 1, and solving the resulting set of simultaneous equations for the polynomial coefficients. In practice, it has been found that for measuring body temperatures, sufficient accuracy can be achieved through the use of only three terms, i.e., through the use of a second order polynomial in $T_a$. For other applications, where greater accuracy may be required, more terms can be used if desired.

Finally, the temperature of a subject whose temperature is to be measured is determined by microprocessor 76 by evaluating the following equation using $V_{ir}$ from pyroelectric sensor 18, $T_a$ as derived from ambient sensor 20, and the polynomial coefficients $a_0$, $a_1$, $a_2$, $a_3$, etc. determined as described above:

$$T_s = (V_{ir}/f(T_a) + T_a^4)^{\frac{1}{4}}$$

The microprocessor 76 is thus adapted to provide the necessary analysis of the electrical signals from the ambient temperature sensor and the pyroelectric sensor, including appropriate scaling, correction, etc., to calculate absolute temperature. The calculated temperature is processed into a digital format for storage in memory and for generating a control signal to drive the digital display. In practice, using the above procedure and a PVDF film, it has been found that body temperature can be reliable measured with the thermometer of the present invention to within approximatelu 0.1° C.

Figure 8:
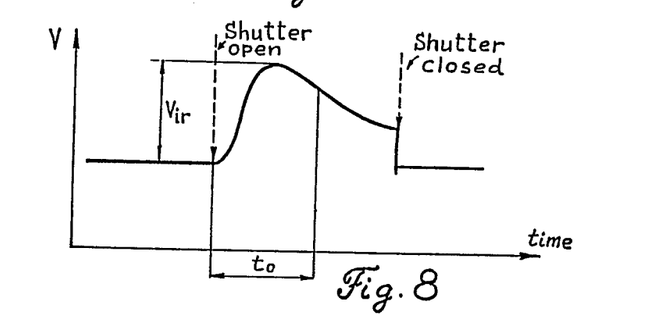
FIG. 8 is a real time graphical representation of the operational sensor signal.

Referring to FIG. 8, a graphic representation of $V_{ir}$ is shown for an exemplary temperature measurement of an object having a temperature greater than the internal ambient temperature of the thermometer. As indicated, the pyroelectric sensor signal ($V_{ir}$) quickly reaches its maximum or peak value after the opening of the shutter and starts to slowly decay. The rate of decay of the signal is dependent upon various physical parameters of the pyroelectric film 44 such as thickness, emissivityl, thermal time constant, etc. In the illustrated embodiment, the microprocessor 76 is responsive only to the peak absolute value of the pyroelectric sensor signal so that the actual period the shutter remains open is not critical as long as the shutter is open long enough to allow the signal to reach its peak absolute value. Where the subject being measured has a temperature greater than the ambient temperature of the thermometer, the peak absolute value of the voltage signal is a maximum voltage as shown in FIG. 8, whereas the peak absolute value would be a minimum voltage if the subject had a temperature lower than the ambient temperature of the thermometer. After the microprocessor 76 determines the peak value, the measurement is complete and the microprocessor becomes insensitive or nonresponsive to further input signals from the pyroelectric sensor.

Alternatively, the microprocessor 76 may be programmed to calculate the absolute temperature of the subject by integration of $V_{ir}$ over a predetermined fixed time frame $t_0$ according to the following equation:

$$e = k_i \int_0^{t_0} V_{ir} dt$$

where, $k_i$ = a calibration factor in 1sec.

The integration method of measurement calculation is more resistant against high frequency noise such as may be picked up by the pyroelectric sensor and is particularly advantageous where the temperature of the subject to be measured is relatively close to the internal temperature of the thermometer.

It is important to note that for both the peak absolute value approach and the integration approach, the signal being measured is the transient response of the pyroelectric film to the infrared radiation reaching the film during the time when shutter 66 is open, that is, in accordance with the present invention, the transient response of the film to a single pulse of infrared radiation is all that is measured. This is in direct contrast to prior art infrared thermometers which either measured the steady state response of the sensor or employed a chopper to break up the incoming infrared radiation into a series of pulses and then averaged the response of the sensor to those pulses. By measuring the transient response, the thermometer of the present invention has a faster response time than prior art thermometers which had to wait until a steady state was achieved; by using only one pulse, the present invention avoids the need for both a chopper and averaging circuitry, thus allowing for the production of a less complicated and less expensive device which is easier to manufacture. Moreover, notwithstanding the fact that only one pulse of infrared radiation is measured, the thermometer of the present invention has been surprisingly found to consistently and accurately measure body temperatures.

Figure 7:
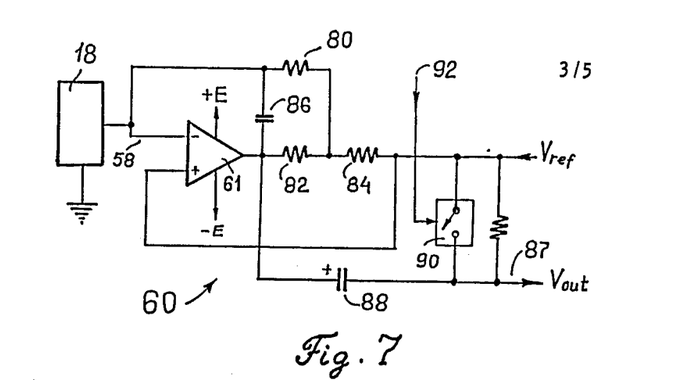
FIG. 7 is an electrical schematic diagram of the amplifier circuit of FIG. 2.

Referring to FIG. 7, the amplifier circuit 60 of the present invention is shown in detail. In the illustrated embodiment, the pyroelectric sensor 18 generates a negative signal in response to positive temperature change. The pyroelectric sensor signal is applied via lead 58 to the negative input terminal of the amplifier 61 and an internally generated reference voltage ($V_{ref}$) is applied to the positive input terminal. Preferably, the amplifier has a JFET or CMOS input stage and is a current-to-voltage converter whose input impedance is dependent upon the bias resistor 80 and the ratio of resistors 82, 84. Capacitor 86 provides negative feedback to maintain the stability of the amplifier and reduce high-frequency noise. Capacitor 88 blocks out low frequency drifts and offset voltages in the voltage output signal $V_{out}$ which is applied to the input of microprocessor 76 by lead 87. The analog switch 90 is normally in a closed position prior to actuation of the shutter assembly 16 so that the ampifier output voltage is equal to the internally generated reference voltage. The analog switch 90 is connected by lead 92 to the shutter actuation sensor switch 77 which generates an indicator signal upon actuation of the shutter assembly 16 by the pushbutton 70. Upon actuation of the shutter assembly, the indicator signal generated by the sensor switch 77 causes the analog switch 90 to open and the voltage output $V_{out}$ is then the amplified signal $V_{ir}$ from the pyroelectric sensor 18 which changes rapidly in response to the infrared radiation from the subject to be measured.

In operation, the outer end of the barrel 14 is positioned in spaced disposition adjacent the subject 11 to be measured. Upon actuation of the pushbutton 70 and the opening of the shutter 66, infrared radiation from the subject 11 is directed along the barrel 14 to the pyroelectric film 44 of the pyroelectric sensor 18. The pyroelectric film 44 generates an electrical signal which is a function of the change in temperature caused by the infrared radiation from the subject 11. Based upon the ambient temperature of the interior of the thermometer as sensed by the ambient sensor 20 and the temperature change of the pyroelectric sensor assembly caused by the infrared radiation reaching the sensor from the subject, the temperature of the subject is calculated by the microprocessor 76 and displayed on the digital display 78. The response time of the thermometer is relatively fast being in the order of 0.25 seconds. As can be seen from the foregoing, a fast temperature reading is obtained with a noncontacting electronic thermometer which is easy to use and economical to manufacture.

Figure 5:
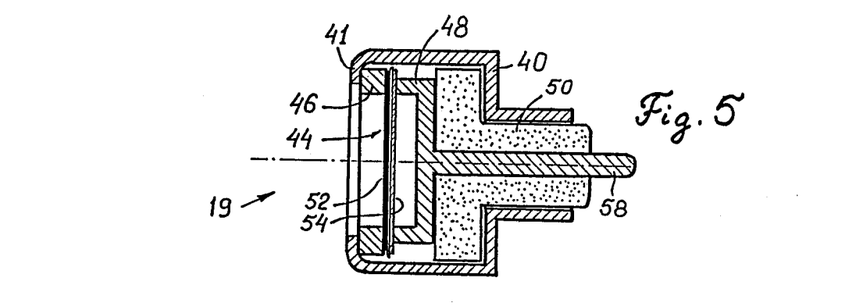
FIG. 5 is a diagrammatical longitudinal sectional view of another embodiment of a pyroelectric sensor.

Another embodiment of a pyroelectric sensor assembly is shown in FIG. 5 being generally designated by the numeral 19. The pyroelectric sensor 19 comprises a contact ring or insert 48 integrally formed with a contact pin 58 which extends through the insulating insert 50. The pyroelectric film 44 is clamped between the contact ring 48 and the clamp 46 with the clamp 46 being held in place by the rolled edges 41 of the base 40. The outer electrode 52 is connected to ground through the clamp 46 and the base 40 while the inner electrode 54 is connectable to the amplifier circuit 22 through the contact ring 48 and the contact pin 58. The remaining elements function similarly to the embodiment of FIG. 3 and need not be described in detail. The configuration of FIG. 5 is particularly suited for economical high-volume manufacture and also facilitates the assembly of the thermometer 10 because of its compatibility with automated manufacturing processes.

Figure 16:
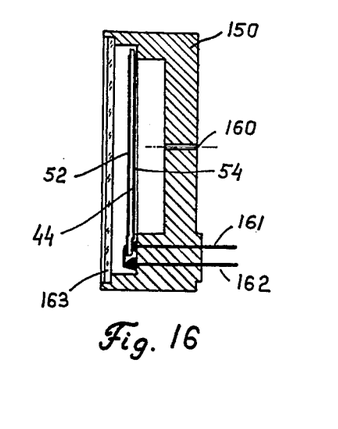
FIG. 16 is a diagrammatical longitudinal sectional view of an additional embodiment of a pyroelectric sensor.
Figure 17:
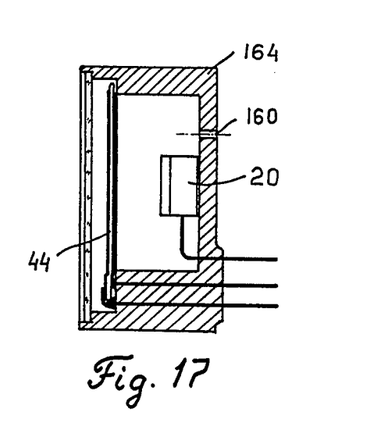
FIG. 17 is a diagrammatical longitudinal sectional view of a further embodiment of a pyroelectric sensor.

Additional embodiments of the pyroelectric sensor assembly are shown in FIGS. 16–17. In FIG. 16, polymer film 44, having electrodes 52 and 54 on its front and rear faces, is mounted inside nonconductive housing or support 150. The film can be mounted to the housing in various ways, such as, through the use of glue, heat welding, or the like. To protect the film, the front face of the sensor can include a cover 163 made of material which is transparent to far infra-red radiation, such as, polyethylene. To equalize the pressure on both sides of the film, housing 150 preferably includes an opening 160 in its rear wall leading into the cavity formed by the film and the walls of the housing.

Two contacts 161 and 162 are molded into housing 150. Contact 162 is connected to front electrode 52, and contact 161 is connected to rear electrode 54. These connections can be made by physical contact or via a conductive media, such as, a conductive epoxy, e.g., Rgon.

FIG. 17 shows a modified version of the sensor assembly of FIG. 16 wherein ambient sensor 20 is mounted in the same housing 164 as polymer film 44. In particular, ambient sensor 20 is mounted in the cavity formed by film 44 and the walls of housing 164. In this way, better thermal coupling between the film and the ambient temperature sensor is achieved.

Figure 9:
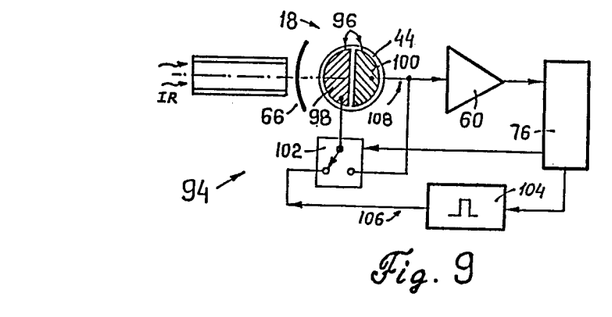
FIG. 9 is a diagrammatical schematic view of a calibration assembly for the electronic thermometer.

Referring to FIG. 9, an optional calibration circuit 94 is shown for calibrating the pyroelectric sensor signal to compensate for possible variations due to material aging, temperature drifts, instability of electronic components, etc. which may produce unacceptable error in the temperature measurement. The pyroelectric film 44 has piezoelectric properties which are necessarily subjected to the same environmental factors (such as material aging, temperature, etc.) as its pyroelectric properties. Consequently, calibration may be attained by an electrical calibration, i.e., piezo-calibration, as opposed to a thermal calibration, i.e, pyro-calibration. The application of a predetermined reference signal to the piezoelectric-pyroelectric film will generate a mechanical stress or deflection at one portion of the film and that stress may be sensed in the other portion of the film since it generates a responsive signal. Thus, calibration is attained through application of a predetermined electrical calibration signal to the pyroelectric film prior to each temperature measurement calculation to generate a responsive signal. The responsive signal is utilized by the micro processor as a correction factor in the temperature calculations.

Referring to FIG. 9, the outer planar electrode 96 on the outwardly facing surface of the pyroelectric film 44 is comprised of two separate spaced electrode segments 98, 100. The electrode segment 100 is connected to amplifier circuit 60. The electrode segment 98 is connected to switch 102 which alternately interconnects the electrode segment 98 to either the amplifier circuit 60 or to an excitation signal circuit 104.

Figure 10:
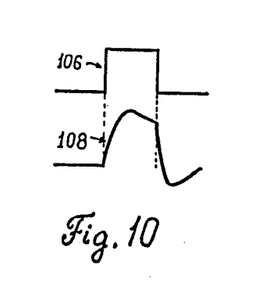
FIG. 10 is a graphic view of the wave forms produced in the calibration assembly of FIG. 9.

The excitation circuit 104 is of conventional design for producing a predetermined electrical calibration signal 106 adapted to excite the piezoelectric film to produce a mechanical stress and, in turn, a responsive electrical signal 108 (FIG. 10). The value of the responsive electrical signal at the time of assembly and initial calibration of the thermometer 10 will constitute a predetermined standard and is stored in memory. The switch 102 and the excitation signal circuit 104 are controlled by the microprocessor 76 and, upon command from the microprocessor 76 during the calibration operation, the excitation signal circuit generates a predetermined electrical calibration signal 106.

The calibration operation is performed with the shutter 66 in a closed position as diagrammatically shown in FIG. 9. Prior to opening the shutter 66, the switch 102 interconnects the electrode segment 98 to the signal excitation circuit 104 and the predetermined electrical signal 106 is applied to the electrode 98. Due to the piezoelectric properties of the pyroelectric film 44, this causes a mechanical stress and, in turn, the mechanical stress causes the piezoelectric film 44 to generate a responsive electrical signal 108 in electrode 96 which is conducted to the amplifier circuit 60 via the electrode segment 100. Since the mechanical stress calibration signal is a predetermined value, deviation in the response signal 108 is indicative of changes in the pyroelectric sensor 18 and the degree of deviation from the predetermined standard provides the necessary calibration information for appropriate correction by the microprocessor 76. Immediately following the calibration operation, the switch 102 interconnects the electrode segment 98 to the amplifier circuit 60 which thereby doubles the infrared sensitivity area of the film and the temperature measurement operation is performed as previously described relative to the embodiment of FIGS. 1 and 2.

Preferably, calibration is performed immediately prior to each measurement operation to ensure reliable and accurate absolute temperature measurement. Any changes in the pyroelectric properties of the pyroelectric film 44 due to aging, environment, etc. will be automatically compensated for by the microprocessor 76 in calculating the absolute temperature of the subject.

Figure 11:
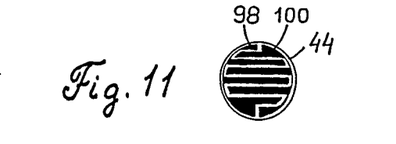
FIG. 11 is another embodiment of the electrode configuration of the pyroelectric sensor of FIG. 9.
Figure 12:
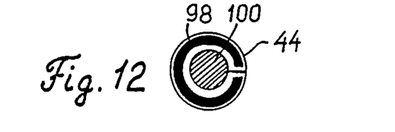
FIG. 12 is a further embodiment of the electrode configuration of the pyroelectric sensor of FIG. 9.

Referring to FIGS. 11 and 12, alternate embodiments of the planar electrode segments 98, 100 are shown. In FIG. 11, the electrode segments 98, 100 are interdigitized on the inward facing surface of the pyroelectric film 44. In FIG. 12, the electrode segment 98 is coaxial to the electrode segment 100 and the electrode segment 98 may be permanently connected to the excitation network 104 thereby eliminating the necessity for switch 102. However, the thermal sensitive area of the pyroelectric film 44 will be limited to the electrode segment 100.

Figure 13:
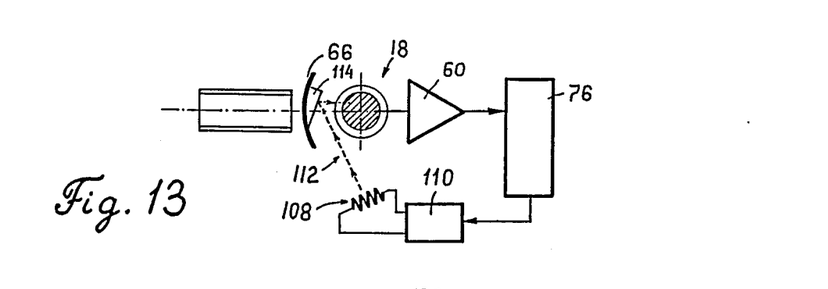
FIG. 13 is a diagrammatical schematic view of an alternate calibration assembly.

Referring to FIG. 13, an alternate configuration for calibrating the pyroelectric sensor assembly 18 is shown. In this configuration, a heating element 108 is controlled by a controller 110 to provide a predetermined stable infrared radiation level upon command from the microprocessor 76.

The inner surface of the shutter 66 has a reflective plate 114 aligned with the heating element 108 and the pyroelectric sensor 18 so as to reflect the infrared beam 112 from the heating element 108 to the pyroelectric sensor assembly. Necessarily, the generated infrared radiation beam 112 is stable under operating conditions. The electrical signal generated by the pyroelectric sensor in response to the infrared beam 112 provides a reference signal to the microprocessor 76 to enable it to calculate the amount of correction required in the subsequent temperature measurement calculation. Again, the calibration operation is performed with the shutter 66 in a closed position and preferably the calibration operation is performed prior to each temperature measurement operation.

Alternately, the microprocessor 76 may be provided with a predetermined table of error correction data based upon the known sources of error and changes in the responsive characteristics of the pyroelectric film. The microprocessor is programmed to adjust the calculated absolute temperature in accordance with the error correction data.

As can be seen, a new and improved noncontacting electronic thermometer has been provided which is accurate, reliable, and economical to manufacture. In operation, the electronic thermometer is compact and easy to use and measures absolute temperature of an object virtually instantaneously.

Figure 14:
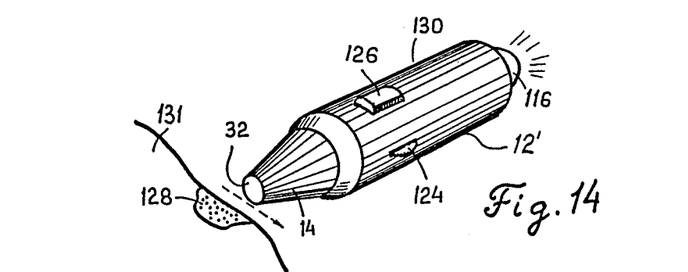
FIG. 14 is a diagrammatical perspective view of a heat detector.
Figure 15:
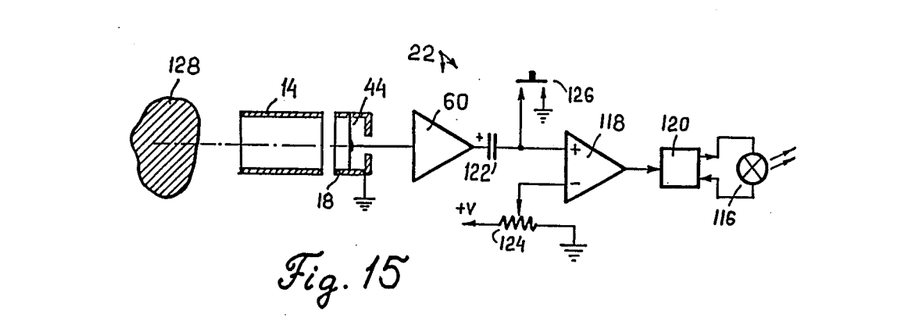
FIG. 15 is a diagrammatical schematic view of the heat detector of FIG. 14.

Referring to FIGS. 14 and 15, a further embodiment of the present invention is shown in the nature of a heat differential detector 130 for the detection of warm spots on a surface. The detection of warm spots is often desirable to locate bone fractures, tissue inflammation, etc. The heat detector 130 generally comprises a housing 121, a barrel 14, a pyroelectric sensor assembly 18 having a pyroelectric film 44, an electric circuit 22 and an indicator light 116.

The barrel 14 and pyroelectric sensor 18 function as previously described with respect to the embodiment of FIG. 1. The electronic circuit 22 generally comprises an amplifier 60, a comparator 118, and an indicator circuit 120. The output of the amplifier 60 is connected through capacitor 122 to the comparator 118. The threshold point of the comparator may be varied by the potentiometer 124. A pushbutton reset switch 126 permits discharge of the capacitor 122 to ground. The indicator circuit 120 is connected to the comparator 118 and drives the indicator light 116 or any other acceptable indicator such as an audio tone generator, etc.

In operation, the capacitor 122 is discharged by momentary actuation of the switch 126 prior to beginning the sensing operation. To sense or detect a warm spot, as for example the warm spot 128 on skin surface 131 as shown in FIG. 14, the heat detector 130 is positioned so that the open receiving end 32 of the barrel 14 is adjacent the surface 131. The heat detector 130 is then moved along the surface at approximately a constant rate of speed. When the warm spot 128 enters the field of view of the barrel 14, the increase in infrared radiation from the warm spot 128 causes the pyroelectric sensor 18 to generate an indicative electrical signal. The amplified electrical signal is applied to the comparator 118 and if the electrical signal exceeds the set threshold value of the comparator, the indicator circuit 120 will be actuated to drive the indicator light 116. The threshold point of the comparator my be varied depending on the particular heat sensing application.

Accordingly, a heat detector is provided which is convenient and easy to use and which is economical to manufacture.

As will be apparent to persons skilled in the art, various modifications and adaptions of the structure above-described will become readily apparent without departure from the spirit and scope of the invention, the scope of which is defined in the appended claims.

What is claimed is:

1. A thermometer comprising:
   a housing;
   a sensor carried by said housing and responsive to infrared radiation for generating an electrical signal which exhibits a transient response upon initial receipt of said radiation;
   means, carried by said housing, in optical alignment with said sensor, for directing infrared radiation from an object, the actual temperature of which is to be measured, to impinge upon said sensor;
   means, carried by said housing, for enabling response of said sensor to said radiation;
   and electrical means carried by said housing and responsive essentially only to said transient response of said signal for processing said signal to develop an indication of the actual temperature of said object.

2. A thermometer as defined in claim 1 in which said directing means is so interconnected to said sensor as to be in thermal equilibrium therewith.

3. A thermometer as defined in claim 1 in which said directing means is in itself of low emissivity to infrared radiation in avoidance of contributing to radiation directed from said object to said sensor.

4. A thermometer as defined in claim 1 in which said directing means exhibits substantial thermal isolation from ambient sources of heat external to said directing means.

5. A thermometer as defined in claim 1 in which said sensor includes a pyroelectric material which generates an electrical charge in response to a change in its temperature produced by its receipt of said radiation.

6. A thermometer as defined in claim 1 in which said sensor is a pyroelectric element sandwiched between a first electrode disposed in use to face said object and a second electrode on the opposed surface of said element, said first electrode exhibiting the characteristic of high emissivity and absorption of said infrared radiation.

7. A thermometer as defined in claim 1 in which said sensor is a pyroelectric element sandwiched between a first electrode disposed in use to face said object and a second electrode on the opposed surface of said element, and in which said second electrode is nontransparent to and highly reflective of said infrared radiation.

8. A thermometer as defined in claim 1 in which said sensor is a pyroelectric element sandwiched between a first electrode disposed in use to face said object and a second electrode on the opposed surface of said element, and in which said first electrode is transparent to far infrared radiation and said second electrode is substantially reflective thereto.

9. A thermometer as defined in claim 1 in which said directing means delivers said infrared radiation from said object spread over an area relatively large laterally to the direction of the impingement of said radiation upon said sensor, and in which said sensor correspondingly responds over an area encompassing said spread.

10. A thermometer as defined in claim 1 in which said electrical means automatically becomes insensitive to further input signals from said sensor after receipt of said transient response.

11. A thermometer as defined in claim 1 in which said electrical means includes means for calculating the absolute temperature of said object by integration of the level of said response over a fixed time frame.

12. A thermometer as defined in claim 1 in which said sensor exhibits said transient in response to a single pulse of said radiation, and in which said electrical means responds only to said single pulse.

13. A thermometer as defined in claim 1 which said sensor is mounted within said housing, and in which said housing includes means to equalize the pressure on both sides of said sensor.

14. A thermometer as defined in claim 1 in which a heating element is carried by said housing in a position to yield heat to said sensor and provide a calibrating stable infrared level imposed upon said sensor;
   and in which said electrical means responds to said sensor as heated by said element.

15. A thermometer as defined in claim 1 in which said electrical means includes an electronic memory which contains a predetermined table of correction data in accordance with known possible sources of error and changes in responsive characteristics of said sensor, with said electrical means programmed to adjust the calculated absolute temperature of said object in accordance with said correction data.

16. The thermometer of claim 1 wherein said directing means comprises an elongated guide of predetermined length having an outer end to receive infrared radiation from the object to be measured and an inner end in operative alignment with said sensor, in which said guide is mounted to said housing and interconnected to said sensor so as to be in thermal equilibrium therewith and with said guide having a smooth and shiny interior surface and an outer surface, and means on said outer surface for thermally isolating said outer surface from external ambient heat sources.

17. The thermometer of claim 16 wherein said means for thermally isolating comprises a thermoisolator coating on said outer surface.

18. A thermometer as defined in claim 1 in which said sensor is responsive to a predetermined electrical calibration signal;
   in which said electrical means include means for applying to said sensor said electrical calibration signal;
   and in which said electrical means responds to the sensor output from said calibration signal by correcting calculation of said actual temperature.

19. A thermometer as defined in claim 18 in which said electrical means at least approximately doubles the sensitivity area to said radiation of said sensor following response to said calibration signal.

20. A thermometer as defined in claim 18 in which said sensor is a pyroelectric element sandwiched between a first electrode disposed to face said object and a second electrode on the opposed surface of said element, and in which one of said electrodes comprises two separate and spaced electrode segments wherein said segments are included in said applying means.

21. A thermometer as defined in claim 20 which further includes means for interconnecting said segments prior to said response of said sensor to said radiation.

22. A thermometer as defined in claim 1 which further includes means carried by said housing and responsive to the ambient temperature of said sensor prior to said initial receipt of said radiation for generating another electrical signal representative of said ambient temperature, and in which said electrical means processes said other electrical signal to calculate actual temperature of said object.

23. A thermometer as defined in claim 22 in which said housing defines an interior chamber, and in which said ambient temperature means also is disposed within said chamber in thermal equilibrium with said sensor.

24. A thermometer as defined in claim 22 in which said ambient temperature means exhibits its electrical signal in slow response as compared with the response of said sensor to said radiation.

25. A thermometer as defined in claim 22 in which said ambient temperature means is mounted within a cavity defined within the interior of said housing.

26. A thermometer of claim 22 wherein the temperature of the object to be measured by said electrical means is calculated using the equation:

$$T^2 = (V_{ir}/f(T_a) + T_a^4)^{\frac{1}{4}},$$

where $T_s$ is the absolute temperature of the object to be measured, $V_{ir}$ is the first electrical signal generated by said sensor, $T_a$ is the absolute ambient temperature determined by said electrical means from said other electrical signal generated by said ambient temperature means, and $f(T_a)$ is a polynomial in $T_a$ given by equation:

$$f(T_a) = a_0 + a_1 T_a + a_2 T_a^2 + a_3 T_a^3 + \ldots,$$

where the polynomial coefficients $a_0$, $a_1$, $a_2$, $a_3$ ... are determined by exposing said sensor at a known ambient temperature to objects having known temperatures.

27. The thermometer of claim 26 wherein the the signal $V_{ir}$ is approximated by using the formula:

$$V_{ir} = f(T_a)(T_s^4 - T_a^4).$$

28. A thermometer as defined in claim 1 in which said enabling means further includes:
a shutter carried by said housing and movable between a first position blocking transmission of said radiation from said directing means to said sensor and a second position which enables passage of said radiation to said sensor;
means for moving said shutter between said first and second positions;
and means for controlling movement of said shutter to enable response of said sensor to said radiation to exhibit said transient response upon receipt of said radiation.

29. A thermometer as defined in claim 28 in which said controlling means enables movement of said shutter to said first position substantially upon termination of said transient response.

30. A thermometer as defined in claim 28 in which said controlling means includes means for suppressing and absorbing noise and shock developed upon the movement of said shutter between said first and second positions.

31. A thermometer as defined in claim 28 in which said housing includes an interior chamber in which said sensor is contained, and in which said shutter is mounted as to be in thermal equilibrium with said sensor.

32. A thermometer as defined in claim 28 which includes means for supplying said electrical means with input signals indicative of the ambient temperature of the said sensor, and in which the actuation of said shutter enables the calculation of the temperature differential between said sensor and said object.

33. A thermometer as defined in claim 28 in which said electrical means includes means for responding to actuation of said shutter in order to provide an indication signal that causes said transient response to be measured.

34. A thermometer as defined in claim 28 in which said shutter exhibits a low thermal conductivity between a first surface which faces said directing means and a second surface which faces said sensor.

35. A thermometer as defined in claim 28 in which both of said surfaces of said shutter are reflective to the said radiation.

36. A method for measuring the temperature of an object with a thermometer having a housing providing an interior chamber and an ambient temperature sensor and a pyroelectric infrared sensor mounted within the chamber comprising the steps of:
shielding said pyroelectric sensor from infrared radiation from exterior to the said thermometer housing;
selectively exposing said pyroelectric sensor to infrared radiation substantially solely from the object to be measured to generate a first electrical signal which is a function of the temperature of the object to be measured and the ambient temperature of said pyroelectric sensor immediately prior to said selective exposing;
sensing the ambient temperature of said pyroelectric sensor and generating a second electrical signal proportional thereto;
and electrically processing said first and second electrical signals to calculate the temperature of the object to be measured.

37. The method of claim 1 wherein the temperature of the object to be measured is calculated using the equation:

$$T_s = (V_{ir}/f(T_a) + T_a^4)^{\frac{1}{4}},$$

where $T_s$ is the absolute temperature of the object to be measured, $V_{ir}$ is the first electrical signal generated by said pyroelectric sensor, $T_a$ is the absolute ambient temperature determined from said second electrical signal, and $f(T_a)$ is a polynomial in $T_a$ given by the equation:

$$f(T_a) = a_0 + a_1 T_a + a_2 T_a^2 + a_3 T_a^3 + \ldots,$$

where the polynomial coefficients $a_0$, $a_1$, $a_2$, $a_3$ ... are determined by exposing said pyroelectric sensor at a known ambient temperature to objects having known temperatures.

38. The device method of claim 37 wherein the signal $V_{ir}$ is approximated by using the formula:

$$V_{ir} = f(T_a)(T_s^4 - T_a^4).$$

39. The method of claim 36 which comprises calibrating the sensitivity of said pyroelectric sensor prior to selectively exposing said pyroelectric sensor to infrared radiation from the object to be measured.

40. The method of claim 39 wherein the said pyroelectric sensor is adapted to exhibit piezoelectric properties and calibrating the sensitivity of said pyroelectric sensor comprises:

applying a predetermined calibration signal to said pyroelectric sensor so as to cause said pyroelectric sensor to generate a responsive electrical calibration signal;

and correcting said first electrical signal generated by said pyroelectric sensor based upon said responsive electrical calibration signal and a predetermined standard value.

41. The method of claim 40 wherein calibrating the sensitivity of said pyroelectric sensor comprises:

applying a predetermined level of infrared radiation to said pyroelectric sensor so as to cause said pyroelectric sensor to generate a responsive electrical calibration signal;

and correcting said first electrical signal generated by said pyroelectric sensor based upon said responsive electrical calibration signal and a predetermined standard value.

* * * * *

UNITED STATES PATENT OFFICE
CERTIFICATE OF CORRECTION

Patent No. 4,797,840                    Dated January 10, 1989

Inventor(s) Jacob Fraden

It is certified that error appears in the above-identified patent and that said Letters Patent is hereby corrected as shown below:

Column 3, line 65: correct the spelling of "electrode".

Column 6, line 26: correct the spelling of "approximately".

Column 6, line 35: correct the spelling of "emissivity".

UNITED STATES PATENT AND TRADEMARK OFFICE
CERTIFICATE OF CORRECTION

PATENT NO. : 4,797,840
DATED : January 10, 1989
INVENTOR(S) : Jacob Fraden

It is certified that error appears in the above-identified patent and that said Letters Patent is hereby corrected as shown below:

Column 13, line 28: correct the equation to read "$T_s = (V_{ir}/f(T_a) + T_a^4)^{1/4}$."

Signed and Sealed this

Sixth Day of June, 1989

Attest:

Attesting Officer

DONALD J. QUIGG

Commissioner of Patents and Trademarks

UNITED STATES PATENT OFFICE
CERTIFICATE OF CORRECTION

Patent No. 4,797,840          Dated January 10, 1989

Inventor(s) Jacob Fraden

It is certified that error appears in the above-identified patent and that said Letters Patent is hereby corrected as shown below:

Claim 27, column 13, line 42: cancel "the" (second-occurrence).

Claim 35, column 14, line 21: cancel "28" and substitute -- 34 --.

Claim 37, column 14, line 44: cancel "1" and substitute -- 36 --.

Claim 38, column 14, line 62: cancel "device".

Signed and Sealed this

Fifth Day of September, 1989

Attest:

DONALD J. QUIGG

Attesting Officer    Commissioner of Patents and Trademarks